(12) United States Patent
Wu et al.

(10) Patent No.: US 12,423,713 B2
(45) Date of Patent: *Sep. 23, 2025

(54) METHOD, SYSTEM, AND COMPUTER PROGRAM PRODUCT FOR FRAUD PREVENTION USING DEEP LEARNING AND SURVIVAL MODELS

(71) Applicant: Visa International Service Association, San Francisco, CA (US)

(72) Inventors: Peng Wu, College Station, TX (US); Pei Yang, Austin, TX (US); Yiwei Cai, Mercer Island, WA (US); Claudia Carolina Barcenas Cardenas, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,925

(22) Filed: Aug. 1, 2023

(65) Prior Publication Data

US 2024/0013235 A1    Jan. 11, 2024

Related U.S. Application Data

(63) Continuation of application No. 17/063,985, filed on Oct. 6, 2020, now Pat. No. 11,756,050.

(51) Int. Cl.
| | |
|---|---|
| *G06Q 30/018* | (2023.01) |
| *G06N 20/00* | (2019.01) |
| *G06Q 20/40* | (2012.01) |
| *G06Q 40/12* | (2023.01) |

(52) U.S. Cl.
CPC ......... *G06Q 30/0185* (2013.01); *G06N 20/00* (2019.01); *G06Q 20/4016* (2013.01); *G06Q 40/12* (2013.12)

(58) Field of Classification Search
CPC ........ G06N 20/00; G06N 3/044; G06N 3/045; G06N 3/08; G06Q 20/4016;
(Continued)

(56) References Cited

U.S. PATENT DOCUMENTS

| | | |
|---|---|---|
| 7,668,776 B1 | 2/2010 | Ahles |
| 7,788,195 B1 | 8/2010 | Subramanian et al. |

(Continued)

FOREIGN PATENT DOCUMENTS

| | | |
|---|---|---|
| RU | 2723448 C1 | 6/2020 |
| WO | 2019179403 A1 | 9/2019 |
| WO | 2020242340 A1 | 12/2020 |

OTHER PUBLICATIONS

Mao et al., "Adaptive Fraud Detection System Using Dynamic Risk Features", arXiv:1810.04654v1, Oct. 2018, pp. 1-19, retrieved from https://arxiv.org/abs/1810.04654.

(Continued)

*Primary Examiner* — Avia Salman
(74) *Attorney, Agent, or Firm* — The Webb Law Firm

(57) ABSTRACT

Provided is a method for fraud prevention using deep learning and survival models. The method may include receiving, with at least one processor, transaction data associated with a plurality of transactions of at least one payment account. At least one attempted attack may be detected based on the transaction data. A fraud risk score for each subperiod of a plurality of subperiods in a time period following the at least one attempted attack may be generated based on the transaction data using a deep learning model and a survival model. The fraud risk score for each respective subperiod may be associated with a probability that a fraudulent transaction will not occur by the respective subperiod. A system and computer program product are also disclosed.

20 Claims, 7 Drawing Sheets

(58) Field of Classification Search
CPC .. G06Q 30/0185; G06Q 40/12; G06Q 20/102; G06Q 20/20; G06Q 20/204; G06Q 20/3278; G06Q 20/34; G06Q 20/405; G06Q 10/0635; G06Q 40/03; G06Q 40/02; G06Q 20/10; G06Q 20/24; G06Q 40/04; G06Q 20/38; G06Q 20/382; G06Q 20/389; G06Q 40/00; G06Q 20/40; G06Q 20/401; G06Q 20/4012; G06Q 20/4014; G06Q 20/3226; G06Q 20/36; G06Q 20/386; G06Q 20/027; G06Q 20/105; G06Q 20/12; G06Q 20/202; G06Q 20/322; G06Q 20/3221; G06Q 20/3224; G06Q 20/341; A24D 1/20; A24F 40/465; G06F 21/55; G06F 2221/2113; H04W 12/67; H04W 12/12; H04L 63/08
USPC .......................................................... 705/30
See application file for complete search history.

(56) References Cited

U.S. PATENT DOCUMENTS

| | | | |
|---|---|---|---|
| 8,805,737 B1 | 8/2014 | Chen et al. | |
| 11,756,050 B2 * | 9/2023 | Wu | G06Q 20/20 705/30 |
| 2017/0300919 A1 * | 10/2017 | Chen | G06F 21/316 |
| 2017/0372232 A1 | 12/2017 | Maughan et al. | |
| 2018/0276541 A1 | 9/2018 | Studnitzer et al. | |
| 2020/0280578 A1 * | 9/2020 | Hearty | H04L 63/1425 |
| 2020/0314101 A1 | 10/2020 | Zhang et al. | |

OTHER PUBLICATIONS

"Visa Account Attack Intelligence", Visa, 2019, p. 1, retrieved from https://usa.visa.com/dam/VCOM/global/run-your-business/documents/visa-account-attack-intelligence-final.pdf.

"Visa Introduces Suite of Security Capabilities to Help Prevent and Disrupt Payment Fraud", Visa, 2019, pp. 1-3, retrieved from https://USA.visa.com/about-visa/newsroom/press-releases.releaseId.16536.html.

"Visa: New Cyber Threats Require New Fraud Tools", Visa, PYMNTS, Aug. 2019, pp. 1-9, retrieved from https://www.pymnts.com/visa/2019/visa-new-cyber-threats-require-new-fraud-tools/.

Zheng et al., "Safe: A Neural Survival Analysis Model for Fraud Early Detection", arXiv:1809.04683v2, 2018, pp. 1-9, retrieved from https://arxiv.org/abs/1809.04683.

Bellotti et al., "Forecasting and Stress Testing Credit Card Default with Dynamic Models", International Journal of Forecasting, 2013, pp. 563-574, vol. 29, No. 4.

* cited by examiner

METHOD, SYSTEM, AND COMPUTER PROGRAM PRODUCT FOR FRAUD PREVENTION USING DEEP LEARNING AND SURVIVAL MODELS

CROSS REFERENCE TO RELATED APPLICATION

This application is a continuation of U.S. patent application Ser. No. 17/063,985, filed Oct. 6, 2020, the disclosure of which is hereby incorporated by reference in its entirety.

BACKGROUND

1. Field

This disclosed subject matter relates generally to methods, systems, and products for fraud prevention and, in some particular embodiments or aspects, to a method, system, and computer program product for fraud prevention using deep learning and survival models.

2. Technical Considerations

Service provider systems (e.g., servers and/or the like) in electronic networks may process a high volume of events (e.g., messages) every day. For example, a transaction service provider system in an electronic payment processing network may process thousands of transactions (e.g., transaction messages such as authorization requests and/or authorization responses) per second. Some of those transactions may be fraudulent, but it may be difficult to determine which transactions are potentially and/or actually fraudulent. For example, between 100,000 and 300,000 account identifiers (e.g., primary account numbers (PANs) and/or the like) may be attacked every day. An attack may refer to an attempt to use an account identifier (e.g., PAN) for a transaction in which other transaction data (e.g., expiration date, security code (e.g., card verification value (CVV), card validation code (CVC), card identification number (CID), card security code (CSC), card verification data (CVD), and/or the like), and/or the like) in the transaction message (e.g., authorization request and/or the like) is invalid (e.g., incorrect, missing, and/or the like). For example, such other transaction data may be randomly generated in an attempt to identify the valid (e.g., correct) value thereof. After such an attack, the likelihood of fraud may change over time (e.g., increase very soon after the attack, decrease after a longer period of time, and/or the like).

Certain transaction provider systems may provide and/or employ various rules for assessing the likelihood that a transaction is fraudulent. However, such rules may be static and/or it may be difficult for such rules to be updated over time to account for different behavior by fraudsters. Additionally, while such rules may assess the likelihood that an individual transaction is fraudulent, the rules may not provide any indication of the likelihood of fraud in the future or different likelihoods of fraud at different times in the future.

Certain transaction provider systems may provide and/or employ a deep learning model (e.g., recurrent neural network (RNN) and/or the like) to predict the likelihood of fraud. However, the prediction may include a single value (e.g., probability and/or the like) associated with the likelihood of fraud within a fixed time period (e.g., 30 days) after a given date (e.g., the date of an attack). Additionally, such models may not provide any indication of the likelihood of fraud at different times in the future or take into account the changing likelihood of fraud at different times (e.g., subperiods) within the time period. Moreover, such models may only account for whether fraud happens or not within a time period but not the time within the time period that such fraud happens. Further, such models may be inefficient to run on a periodic (e.g., daily and/or the like) basis, e.g., due to the amount of time and/or resources it takes to run such models (e.g., train and/or make predictions therewith).

SUMMARY

Accordingly, it is an object of the presently disclosed subject matter to provide methods, systems, and computer program products for fraud prevention using deep learning and survival models.

According to non-limiting embodiments or aspects, provided is a computer-implemented method for fraud prevention. In some non-limiting embodiments or aspects, a computer-implemented method for fraud prevention may include receiving transaction data associated with a plurality of transactions of at least one payment account. At least one attempted attack may be detected based on the transaction data. A fraud risk score for each subperiod of a plurality of subperiods in a time period following the attempted attack(s) may be generated based on the transaction data using a deep learning model and a survival model. The fraud risk score for each respective subperiod may be associated with a probability that a fraudulent transaction will not occur by the respective subperiod.

In some non-limiting embodiments or aspects, the transaction data may include all transactions associated with the at least one account during a preceding time period.

In some non-limiting embodiments or aspects, the deep learning model may include at least one of a deep neural network, a recurrent neural network (RNN), a long short term memory (LSTM) network, or any combination thereof. Additionally or alternatively, the survival model may include a Cox regression model.

In some non-limiting embodiments or aspects, a loss function for the deep learning model may be based on the survival model.

In some non-limiting embodiments or aspects, generating the fraud risk score may include generating, using the deep learning model, at least one embedding for each payment account based on the transaction data and generating, using the survival model, the fraud risk score for each subperiod based on the embedding(s).

In some non-limiting embodiments or aspects, each subperiod may be a day and the time period may be a month, 30 days, and/or the like.

In some non-limiting embodiments or aspects, a survival curve may be generated based on the fraud risk score for each subperiod. Additionally or alternatively, an area bounded by the survival curve may be determined. Additionally or alternatively, the area may be compare to a threshold to determine whether the at least one payment account is in a high risk category.

In some non-limiting embodiments or aspects, a subsequent transaction may be rejected based on the risk score.

According to non-limiting embodiments or aspects, provided is a system for fraud prevention. In some non-limiting embodiments or aspects, the system for fraud prevention may include at least one processor and at least one non-transitory computer-readable medium, which may include one or more instructions that, when executed by the processor(s), direct the processor(s) to receive transaction data associated with a plurality of transactions of at least one payment account. At least one attempted attack may be detected based on the transaction data. A fraud risk score for each subperiod of a plurality of subperiods in a time period following the attempted attack(s) may be generated based on the transaction data using a deep learning model and a survival model. The fraud risk score for each respective subperiod may be associated with a probability that a fraudulent transaction will not occur by the respective subperiod.

In some non-limiting embodiments or aspects, the transaction data may include all transactions associated with the at least one account during a preceding time period.

In some non-limiting embodiments or aspects, the deep learning model may include at least one of a deep neural network, a recurrent neural network (RNN), a long short term memory (LSTM) network, or any combination thereof. Additionally or alternatively, the survival model may include a Cox regression model.

In some non-limiting embodiments or aspects, a loss function for the deep learning model may be based on the survival model.

In some non-limiting embodiments or aspects, generating the fraud risk score may include generating, using the deep learning model, at least one embedding for each payment account based on the transaction data and generating, using the survival model, the fraud risk score for each subperiod based on the embedding(s).

In some non-limiting embodiments or aspects, each subperiod may be a day and the time period may be a month, 30 days, and/or the like.

In some non-limiting embodiments or aspects, a survival curve may be generated based on the fraud risk score for each subperiod. Additionally or alternatively, an area bounded by the survival curve may be determined. Additionally or alternatively, the area may be compare to a threshold to determine whether the at least one payment account is in a high risk category.

In some non-limiting embodiments or aspects, a subsequent transaction may be rejected based on the risk score.

According to non-limiting embodiments or aspects, provided is a computer program product for fraud prevention. The computer program product may include at least one non-transitory computer-readable medium including one or more instructions that, when executed by at least one processor, cause the at least one processor to receive transaction data associated with a plurality of transactions of at least one payment account. At least one attempted attack may be detected based on the transaction data. A fraud risk score for each subperiod of a plurality of subperiods in a time period following the attempted attack(s) may be generated based on the transaction data using a deep learning model and a survival model. The fraud risk score for each respective subperiod may be associated with a probability that a fraudulent transaction will not occur by the respective subperiod.

In some non-limiting embodiments or aspects, the transaction data may include all transactions associated with the at least one account during a preceding time period.

In some non-limiting embodiments or aspects, the deep learning model may include at least one of a deep neural network, a recurrent neural network (RNN), a long short term memory (LSTM) network, or any combination thereof. Additionally or alternatively, the survival model may include a Cox regression model.

In some non-limiting embodiments or aspects, a loss function for the deep learning model may be based on the survival model.

In some non-limiting embodiments or aspects, generating the fraud risk score may include generating, using the deep learning model, at least one embedding for each payment account based on the transaction data and generating, using the survival model, the fraud risk score for each subperiod based on the embedding(s).

In some non-limiting embodiments or aspects, each subperiod may be a day and the time period may be a month, 30 days, and/or the like.

In some non-limiting embodiments or aspects, a survival curve may be generated based on the fraud risk score for each subperiod. Additionally or alternatively, an area bounded by the survival curve may be determined. Additionally or alternatively, the area may be compare to a threshold to determine whether the at least one payment account is in a high risk category.

In some non-limiting embodiments or aspects, a subsequent transaction may be rejected based on the risk score.

Further embodiments are set forth in the following numbered clauses:

Clause 1: A computer-implemented method, comprising: receiving, with at least one processor, transaction data associated with a plurality of transactions of at least one payment account; detecting, with the at least one processor, at least one attempted attack based on the transaction data; and generating, with the at least one processor, using a deep learning model and a survival model, a fraud risk score for each subperiod of a plurality of subperiods in a time period following the at least one attempted attack based on the transaction data, the fraud risk score for each respective subperiod being associated with a probability that a fraudulent transaction will not occur by the respective subperiod.

Clause 2: The method of clause 1, wherein the transaction data includes all transactions associated with the at least one account during a preceding time period.

Clause 3: The method of any preceding clause, wherein the deep learning model comprises at least one of a deep neural network, a recurrent neural network (RNN), a long short term memory (LSTM) network, or any combination thereof.

Clause 4: The method of any preceding clause, wherein the survival model comprises a Cox regression model.

Clause 5: The method of any preceding clause, wherein a loss function for the deep learning model is based on the survival model.

Clause 6: The method of any preceding clause, wherein generating the fraud risk score comprises: generating, with the at least one processor, using the deep learning model, at least one embedding for each payment account of the at least one payment account based on the transaction data; and generating, with the at least one processor, using the survival model, the fraud risk score for each subperiod based on the at least one embedding.

Clause 7: The method of any preceding clause, wherein each subperiod comprises a day and the time period comprises a month.

Clause 8: The method of any preceding clause, further comprising: generating, with the at least one processor, a survival curve based on the fraud risk score for each subperiod.

Clause 9: The method of any preceding clause, further comprising: determining, with the at least one processor, an area bounded by the survival curve; and comparing, with the at least one processor, the area to a threshold to determine whether the at least one payment account is in a high risk category.

Clause 10: The method of any preceding clause, further comprising: rejecting, with the at least one processor, a subsequent transaction based on the risk score.

Clause 11: A system, comprising: at least one processor; and at least one non-transitory computer-readable medium including one or more instructions that, when executed by the at least one processor, direct the at least one processor to: receive transaction data associated with a plurality of transactions of at least one payment account; detect at least one attempted attack based on the transaction data; and generate using a deep learning model and a survival model, a fraud risk score for each subperiod of a plurality of subperiods in a time period following the at least one attempted attack based on the transaction data, the fraud risk score for each respective subperiod being associated with a probability that a fraudulent transaction will not occur by the respective subperiod.

Clause 12: The system of clause 11, wherein the deep learning model comprises at least one of a deep neural network, a recurrent neural network (RNN), a long short term memory (LSTM) network, or any combination thereof; and wherein the survival model comprises a Cox regression model.

Clause 13: The system of one of clauses 11 or 12, wherein a loss function for the deep learning model is based on the survival model.

Clause 14: The system of any one of clauses 11-13, wherein generating the fraud risk score comprises: generating, using the deep learning model, at least one embedding for each payment account of the at least one payment account based on the transaction data; and generating, using the survival model, the fraud risk score for each subperiod based on the at least one embedding.

Clause 15: The system of any one of clauses 11-14, wherein the one or more instructions, when executed by the at least one processor, further direct the at least one processor to: generate a survival curve based on the fraud risk score for each subperiod; determine an area bounded by the survival curve; and compare the area to a threshold to determine whether the at least one payment account is in a high risk category.

Clause 16: A computer program product comprising at least one non-transitory computer-readable medium including one or more instructions that, when executed by at least one processor, cause the at least one processor to: receive transaction data associated with a plurality of transactions of at least one payment account; detect at least one attempted attack based on the transaction data; and generate using a deep learning model and a survival model, a fraud risk score for each subperiod of a plurality of subperiods in a time period following the at least one attempted attack based on the transaction data, the fraud risk score for each respective subperiod being associated with a probability that a fraudulent transaction will not occur by the respective subperiod.

Clause 17: The computer program product of clause 16, wherein the deep learning model comprises at least one of a deep neural network, a recurrent neural network (RNN), a long short term memory (LSTM) network, or any combination thereof; and wherein the survival model comprises a Cox regression model.

Clause 18: The computer program product of one of clauses 16 or 17, wherein a loss function for the deep learning model is based on the survival model.

Clause 19: The computer program product of any one of clauses 16-18, wherein generating the fraud risk score comprises: generating, using the deep learning model, at least one embedding for each payment account of the at least one payment account based on the transaction data; and generating, using the survival model, the fraud risk score for each subperiod based on the at least one embedding.

Clause 20: The computer program product of any one of clauses 16-19, wherein the one or more instructions, when executed by the at least one processor, further cause the at least one processor to: generate a survival curve based on the fraud risk score for each subperiod; determine an area bounded by the survival curve; and compare the area to a threshold to determine whether the at least one payment account is in a high risk category.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which.

DESCRIPTION

Figure 1:
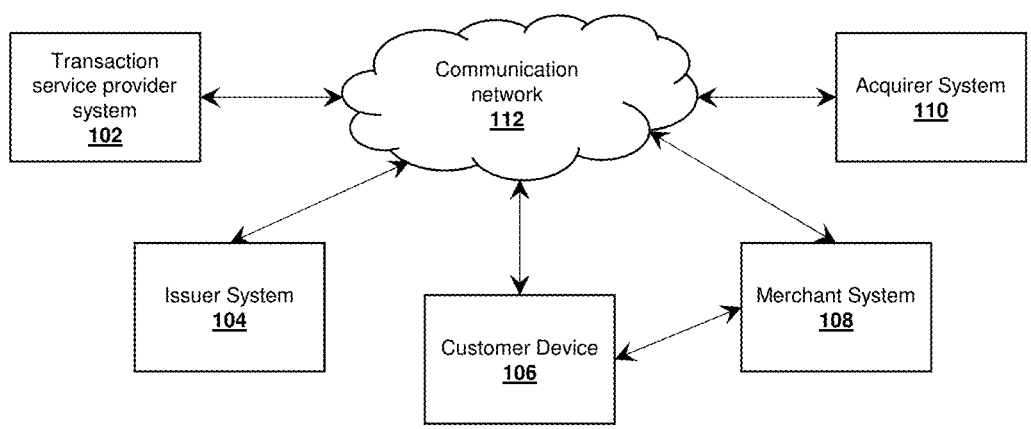
FIG. 1 is a diagram of a non-limiting embodiment or aspect of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a payment token, and/or the like). In some non-limiting embodiments or aspects, an issuer institution may provide an account identifier (e.g., a PAN, a payment token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a payment token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments or aspects, a payment token may be "format preserving" and may have a numeric format that conforms to the account identifiers used in existing payment processing networks (e.g., ISO 8583 financial transaction message format). In some non-limiting embodiments or aspects, a payment token may be used in place of a PAN to initiate, authorize, settle, or resolve a payment transaction or represent the original credential in other systems where the original credential would typically be provided. In some non-limiting embodiments or aspects, a token value may be generated such that the recovery of the original PAN or other account identifier from the token value may not be computationally derived (e.g., with a one-way hash or other cryptographic function). Further, in some non-limiting embodiments or aspects, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments or aspects of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments or aspects, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments or aspects, a requestor may interface with a network token system through any suitable communication network and/or protocol (e.g., using HTTPS, SOAP, and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments or aspects, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments or aspects, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments or aspects, token requestor identifiers may be revoked and/or token requestors may be assigned new token requestor identifiers.

In some non-limiting embodiments or aspects, this information may be subject to reporting and audit by the token service provider.

As used herein, the term "token service provider" may refer to an entity including one or more server computers in a token service system that generates, processes, and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments or aspects, the token service provider may have the ability to set aside licensed BINs as token BINs to issue tokens for the PANs that may be submitted to the token service provider. In some non-limiting embodiments or aspects, various entities of a tokenization ecosystem may assume the roles of the token service provider. For example, payment networks and issuers or their agents may become the token service provider by implementing the token services according to non-limiting embodiments or aspects of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments or aspects, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments or aspects, the token vault may be a part of a token service system. For example, the token vault may be provided as a part of the token service provider. Additionally or alternatively, the token vault may be a remote repository accessible by the token service provider. In some non-limiting embodiments or aspects, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. As used herein, the term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments or aspects of the disclosed subject matter are directed to systems, methods, and computer program products for fraud prevention, including, but not limited to, fraud prevention using deep learning and survival models. For example, non-limiting embodiments or aspects of the disclosed subject matter provide detecting at least one attempted attack (e.g., based on transaction data) and generating a fraud risk score for each subperiod in a time period following the attempted attack(s) based on the transaction data using a deep learning model and a survival model. Such embodiments or aspects provide techniques and systems that allow for not only an indication of the likelihood of fraud in the future but also different likelihoods of fraud at different times (e.g., each subperiod) in the future, which may take into account the changing likelihood of fraud at different times (e.g., subperiods) within the time period. Additionally or alternatively, such embodiments or aspects provide techniques and systems that provide improved accuracy and precision for the fraud risk scores, since they can accurately reflect the changing likelihood of fraud over time. Additionally or alternatively, such embodiments or aspects provide techniques and systems that allow for fraud risk scores for each subperiod (e.g., day) of a time period, e.g., in addition to or in lieu of a single risk score for the time period. Additionally or alternatively, such embodiments or aspects provide techniques and systems that enable predictions (e.g., fraud risk scores) taking into account not only whether fraud is likely to occur during the time period but also the time within the time period that such fraud is likely to occur. Additionally or alternatively, such embodiments or aspects provide techniques and systems that allow for improved efficiency (e.g., in terms of time, computing resources, and/or the like) since risk scores are created for each subperiod (e.g., day) of a time period (e.g., month, 30 days, and/or the like) without the need to separately run the models on a periodic (e.g., daily and/or the like) basis.

For the purpose of illustration, in the following description, while the presently disclosed subject matter is described with respect to methods, systems, and computer program products for fraud prevention using deep learning and survival models, e.g., for payment transactions, one skilled in the art will recognize that the disclosed subject matter is not limited to the illustrative embodiments or aspects. For example, the methods, systems, and computer program products described herein may be used with a wide variety of settings, such as fraud prevention in any setting suitable for using such prevention, e.g., online account creation, social media transactions (e.g., interactions), and/or the like. Additionally or alternatively, the methods, systems, and computer program products described herein may be used with a wide variety of settings, such as time-based predictions in any setting suitable for using such predictions, e.g., verification (e.g., payment card identification and/or the like), authorization (e.g., payment transaction authorization and/or the like), and/or the like.

Referring now to FIG. 1, FIG. 1 is a diagram of a non-limiting embodiment or aspect of an environment 100 in which systems, products, and/or methods, as described herein, may be implemented. As shown in FIG. 1, environment 100 includes transaction service provider system 102, issuer system 104, customer device 106, merchant system 108, acquirer system 110, and communication network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to transaction service provider system 102. In some non-limiting embodiments or aspects, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via network 112. Additionally or alternatively, each customer device 106 may include a device capable of receiving information from and/or communicating information to other customer devices 106 via network 112, another network (e.g., an ad hoc network, a local network, a private network, a virtual private network, and/or the like), and/or any other suitable communication technique. For example, customer device 106 may include a client device and/or the like. In some non-limiting embodiments or aspects, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via network 112, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments or aspects, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

In some non-limiting embodiments or aspects, processing a transaction may include generating and/or communicating at least one transaction message (e.g., authorization request, authorization response, any combination thereof, and/or the like). For example, a client device (e.g., customer device 106, a POS device of merchant system 108, and/or the like) may initiate the transaction, e.g., by generating an authorization request. Additionally or alternatively, the client device (e.g., customer device 106, at least one device of merchant system 108, and/or the like) may communicate the authorization request. For example, customer device 106 may communicate the authorization request to merchant system 108 and/or a payment gateway (e.g., a payment gateway of transaction service provider system 102, a third-party payment gateway separate from transaction service provider system 102, and/or the like). Additionally or alternatively, merchant system 108 (e.g., a POS device thereof) may communicate the authorization request to acquirer system 110 and/or a payment gateway. In some non-limiting embodiments or aspects, acquirer system 110 and/or a payment gateway may communicate the authorization request to transaction service provider system 102 and/or issuer system 104. Additionally or alternatively, transaction service provider system 102 may communicate the authorization request to issuer system 104. In some non-limiting embodiments or aspects, issuer system 104 may determine an authorization decision (e.g., authorize, decline, and/or the like) based on the authorization request. For example, the authorization request may cause issuer system 104 to determine the authorization decision based thereof. In some non-limiting embodiments or aspects, issuer system 104 may generate an authorization response based on the authorization decision. Additionally or alternatively, issuer system 104 may communicate the authorization response. For example, issuer system 104 may communicate the authorization response to transaction service provider system 102 and/or a payment gateway. Additionally or alternatively, transaction service provider system 102 and/or a payment gateway may communicate the authorization response to acquirer system 110, merchant system 108, and/or customer device 106. Additionally or alternatively, acquirer system 110 may communicate the authorization response to merchant system 108 and/or a payment gateway. Additionally or alternatively, a payment gateway may communicate the authorization response to merchant system 108 and/or customer device 106. Additionally or alternatively, merchant system 108 may communicate the authorization response to customer device 106. In some non-limiting embodiments or aspects, merchant system 108 may receive (e.g., from acquirer system 110 and/or a payment gateway) the authorization response. Additionally or alternatively, merchant system 108 may complete the transaction based on the authorization response (e.g., provide, ship, and/or deliver goods and/or services associated with the transaction; fulfill an order associated with the transaction; any combination thereof; and/or the like).

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
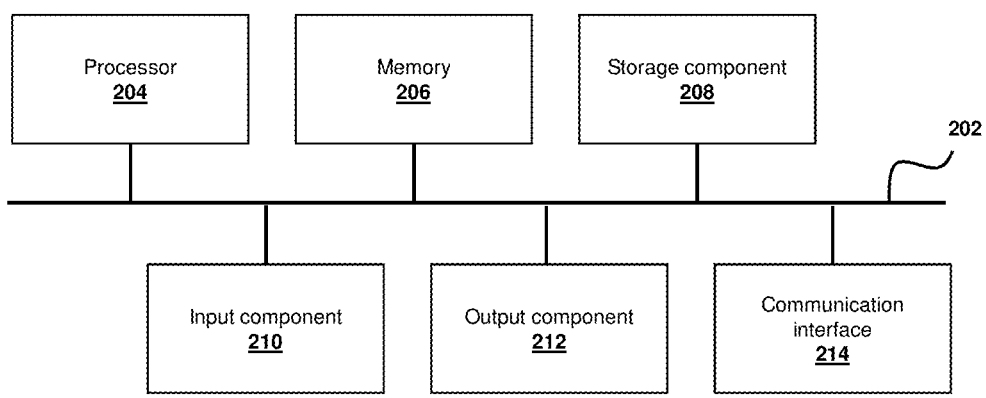
FIG. 2 is a diagram of a non-limiting embodiment or aspect of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments or aspects, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, firmware, and/or any combination thereof. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
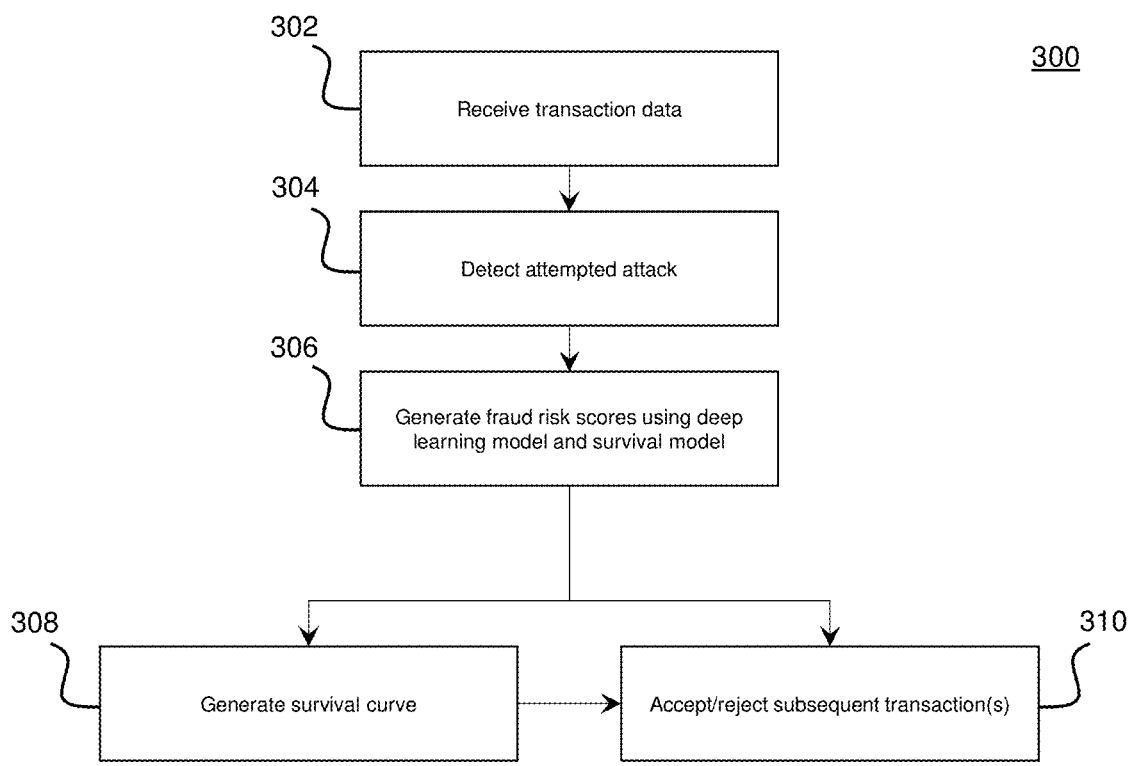
FIG. 3 is a flowchart of a non-limiting embodiment or aspect of a process for fraud prevention according to the principles of the presently disclosed subject matter.

Referring now to FIG. 3, FIG. 3 is a flowchart of a non-limiting embodiment or aspect of a process 300 for fraud prevention. In some non-limiting embodiments or aspects, one or more of the steps of process 300 may be performed (e.g., completely, partially, and/or the like) by transaction service provider system 102 (e.g., one or more devices of transaction service provider system 102). In some non-limiting embodiments or aspects, one or more of the steps of process 300 may be performed (e.g., completely, partially, and/or the like) by another system, another device, another group of systems, or another group of devices, separate from or including transaction service provider system 102, such as issuer system 104, customer device 106, merchant system 108, acquirer system 110, and/or the like. In some non-limiting embodiments or aspects, a transaction database may be the same as, similar to, part of (e.g., a subsystem of and/or the like), and/or implemented (e.g., completely, partially, and/or the like) by transaction service provider system 102. Additionally or alternatively, the transaction database may be the same as, similar to, part of (e.g., a subsystem of and/or the like), and/or implemented (e.g., completely, partially, and/or the like) by another system, another device, another group of systems, or another group of devices, separate from or including transaction service provider system 102, such as issuer system 104. In some non-limiting embodiments or aspects, a deep learning model system may be the same as, similar to, part of (e.g., a subsystem of and/or the like), and/or implemented (e.g., completely, partially, and/or the like) by transaction service provider system 102. Additionally or alternatively, the deep learning model system may be the same as, similar to, part of (e.g., a subsystem of and/or the like), and/or implemented (e.g., completely, partially, and/or the like) by another system, another device, another group of systems, or another group of devices, separate from or including transaction service provider system 102, such as issuer system 104. In some non-limiting embodiments or aspects, a survival model system may be the same as, similar to, part of (e.g., a subsystem of and/or the like), and/or implemented (e.g., completely, partially, and/or the like) by transaction service provider system 102. Additionally or alternatively, the survival model system may be the same as, similar to, part of (e.g., a subsystem of and/or the like), and/or implemented (e.g., completely, partially, and/or the like) by another system, another device, another group of systems, or another group of devices, separate from or including transaction service provider system 102, such as issuer system 104. In some non-limiting embodiments or aspects, a fraud detection system may be the same as, similar to, part of (e.g., a subsystem of and/or the like), and/or implemented (e.g., completely, partially, and/or the like) by issuer system 104. Additionally or alternatively, the fraud detection system may be the same as, similar to, part of (e.g., a subsystem of and/or the like), and/or implemented (e.g., completely, partially, and/or the like) by another system, another device, another group of systems, or another group of devices, separate from or including issuer system 104, such as transaction service provider system 102.

As shown in FIG. 3, at step 302, process 300 may include receiving transaction data. For example, transaction service provider system 102 may receive transaction data associated with a plurality of transactions of at least one payment account. In some non-limiting embodiments or aspects, transaction service provider system 102 may receive the transaction data from at least one of issuer system 104, customer device 106, merchant system 108, acquirer system 110, any combination thereof, and/or the like. In some non-limiting embodiments or aspects, such transaction data may be received during processing a transaction (e.g., generating and/or communicating at least one transaction message (e.g., authorization request, authorization response, any combination thereof, and/or the like)), as described herein. Additionally or alternatively, transaction service provider system 102 may store the transaction data in a transaction database (e.g., of transaction service provider system 102 and/or the like). For example, the transaction data may be stored in the transaction database before it is received by a deep learning model system (e.g., of transaction service provider system 102 and/or the like). In some non-limiting embodiments or aspects, transaction service provider system 102 may receive the transaction data from the transaction database (e.g., of transaction service provider system 102, issuer system 104, and/or the like).

In some non-limiting embodiments or aspects, a deep learning model system (e.g., of transaction service provider system 102 and/or the like) may receive (e.g., retrieve and/or the like) transaction data. For example, the deep learning model system may receive (e.g., retrieve and/or the like) transaction data associated with (at least some of) the transactions of the payment account(s) from the transaction database (e.g., of transaction service provider system 102 and/or the like).

In some non-limiting embodiments or aspects, the transaction data may include all transactions associated with the at least one account during a preceding time period. For example, the preceding time period may be a selectable (e.g., preselected, dynamically selected, and/or the like) time period. Additionally or alternatively, the preceding time period may include all time up to the current time (e.g., the transaction data may include all historical transactions associated with the at least one account up to the current time).

In some non-limiting embodiments or aspects, the at least one account may include a single account identified by at least one account identifier (e.g., a PAN, a card number, a payment card number, a payment token, and/or the like). For example, the (single) account may be identified by a PAN.

In some non-limiting embodiments or aspects, the transaction data for each transaction may include any data (e.g., fields, values, and/or the like) available in at least one transaction message (e.g., authorization request, authorization response, any combination thereof, and/or the like) associated with the transaction. Additionally or alternatively, the transaction data for each transaction may include a subset of such data from the transaction message(s). Additionally or alternatively, the transaction data may include at least one additional data item (e.g., field, value, and/or the like) added to the data from the transaction message(s) (or the subset thereof), e.g., by transaction service provider system 102, issuer system 104, customer device 106, merchant system 108, acquirer system 110, and/or the like.

As shown in FIG. 3, at step 304, process 300 may include detecting at least one attempted attack. For example, transaction service provider system 102 and/or issuer system 104 may detect the attempted attack(s) based on the transaction data.

In some non-limiting embodiments or aspects, transaction service provider system 102 and/or issuer system 104 may detect an attempted attack based on determining that transaction data associated with at least one transaction includes an account identifier (e.g., PAN) for which other transaction data (e.g., expiration date, security code (e.g., CVV, CVC, CID, CSC, CVD, and/or the like), and/or the like) is invalid (e.g., incorrect, missing, and/or the like). Additionally or alternatively, transaction service provider system 102 and/or issuer system 104 may reject a transaction based on receiving a transaction message (e.g., authorization request and/or the like) including transaction data that includes an account identifier (e.g., PAN) for which other transaction data (e.g., expiration date, security code, and/or the like) is invalid, and the transaction service provider system 102 and/or issuer system 104 may detect the attempted attack based on such rejection. Additionally or alternatively, issuer system 104 may reject a transaction for the aforementioned reasons and communicate an authorization response indicating that the transaction is rejected, and transaction service provider system 102 may detect the attempted attack based on such authorization response from issuer system 104.

As shown in FIG. 3, at step 306, process 300 may include generating fraud risk scores using a deep learning model and a survival model. For example, transaction service provider system 102 may use a deep learning model and a survival model to generate a fraud risk score for each subperiod of a plurality of subperiods in a time period following the attempted attack(s) based on the transaction data. In some non-limiting embodiments or aspects, the fraud risk score for each respective subperiod may be associated with a probability that a fraudulent transaction will not occur by the respective subperiod. Additionally or alternatively, the fraud risk score for each respective subperiod may be associated with a probability that a fraudulent transaction will occur by the respective subperiod.

In some non-limiting embodiments or aspects, the time period may include a first selectable (e.g., preselected, dynamically selected, and/or the like) time period after the attempted attack, and each subperiod may include a second selectable time period shorter than the first selectable time period (e.g., and within the first selectable time period). For example, the time period (e.g., first selectable time period) may include a day, a week, a month, a 30-day period, and/or the like (e.g., after the attempted attack), and each subperiod (e.g., second selectable time period) may include an hour, a day, a week, and/or the like. In some non-limiting embodiments or aspects, each subperiod (e.g., second selectable time period) may include a day and the time period (e.g., first selectable time period) may include a 30-day period and/or a calendar month (e.g., after the attempted attack). As such, a fraud risk score may be generated for each day of approximately one month (e.g., a 30-day period) following the attempted attack.

In some non-limiting embodiments or aspects, the deep learning model may include at least one of a deep neural network, a recurrent neural network (RNN), a long short term memory (LSTM) network, any combination thereof, and/or the like. In some non-limiting embodiments or aspects, the deep learning model may be implemented (e.g., completely, partially, and/or the like) by transaction service provider system 102, a deep learning model system (e.g., a subsystem of transaction service provider system 102), any combination thereof, and/or the like.

In some non-limiting embodiments or aspects, the deep learning model may be trained (e.g., by transaction service provider system 102 and/or the deep learning model system) based on the transaction data for a plurality of transactions associated with a plurality of accounts (e.g., historical transaction data associated with a plurality of historical transactions received by transaction service provider system 102 and/or stored in the transaction database, as described herein). In some non-limiting embodiments or aspects, during such training, the parameters (e.g., weight parameters, bias parameters, and/or the like) of the deep learning model may be updated, e.g., based on a loss function. Additionally or alternatively, the amount by which the parameters of the deep learning model are updated may be adjusted based on context, e.g., the length of transaction history (e.g., date of earliest transaction and/or the like) of the account(s) associated with the transaction data (e.g., historical transaction data). For example, a field (e.g., a binary number, a flag, and/or the like) may be added to the transaction data indicating that the transaction history is long (e.g., longer than a threshold) or not (e.g., shorter than the threshold). Additionally or alternatively, the field (e.g., binary number, flag, and/or the like) may be used as an outcome for another classification model to train the propensity of long transaction history for the account(s), and/or the propensity may be incorporated into a loss function to adjust the amount by which deep learning parameters update. In some non-limiting embodiments or aspects, the length of transaction history may be represented by the date of the earliest transaction associated with each account. In some non-limiting embodiments or aspects, a longer transaction history may result in a greater adjustment of parameters of the deep learning model. For example, if the field indicates that the transaction history is long, as described above, the adjustment of parameters may be greater (e.g., increased by a multiplicative factor, doubled, and/or the like), e.g., compared to when the transaction history is not long.

In some non-limiting embodiments or aspects, after an attempted attack is detected for an account, the transaction data of the transactions associated with that account (e.g., all transactions associated with the account during the preceding time period, which may be stored in the transaction database, as described herein) may be provided as input to the deep learning model (e.g., by transaction service provider system 102 and/or the deep learning model system) to generate output (e.g., embeddings, fraud risk scores, and/or the like, as described herein).

In some non-limiting embodiments or aspects, the survival model may include a Cox regression model (e.g., Cox proportional hazards (PH) regression model and/or the like). In some non-limiting embodiments or aspects, the survival model may be implemented (e.g., completely, partially, and/or the like) by transaction service provider system 102, a survival model system (e.g., a subsystem of transaction service provider system 102), as (at least part of) the loss function for the deep learning model (e.g., in the deep learning model system), any combination thereof, and/or the like.

In some non-limiting embodiments or aspects, generating the fraud risk score may include using the deep learning model (e.g., by transaction service provider system 102 and/or the deep learning model system) to generate at least one embedding for the payment account(s) (e.g., the payment account(s) for which the attempted attack(s) were detected) based on the transaction data. Additionally or alternatively, the survival model may be used (e.g., by transaction service provider system 102 and/or the survival model system) to generate the fraud risk score for each subperiod based on the embedding(s) for the payment account(s). In some non-limiting embodiments or aspects, each embedding may include an embedding vector (e.g., encoded vector, a lower-dimensional vector, a hidden layer vector, a logits layer vector, an output vector, and/or the like) including a plurality of features (e.g., embedding vector features). For example, transaction data associated with each account may include a plurality of features. Additionally or alternatively, transaction service provider system 102 and/or the deep learning model system may provide such features as input to the deep learning model and use the deep learning model to generate as output the embedding (e.g., embedding vector), which may have a smaller number of features than the transaction data (e.g., the deep learning model maps the input features to a lower-dimensional embedding vector as output). In some non-limiting embodiments or aspects, the embedding(s) may be provided (e.g., by transaction service provider system 102 and/or the survival model system) to the survival model as input, and the survival model may generate the fraud risk score for each subperiod as output based on the embeddings (e.g., learn functional form from features of the embedding(s) to survival hazard (e.g., likelihood of fraud)). Additionally or alternatively, the survival model may output a sequence of risk scores for each payment account (e.g., the payment account(s) for which the attempted attack was detected) for the subperiods (e.g., each day) during the time period (e.g., 30-day period) after the attempted attack.

In some non-limiting embodiments or aspects, a loss function for the deep learning model may be based on the survival model. For example, the deep learning model may use the loss function from the survival model. In some non-limiting embodiments or aspects, the loss (e.g., $l_i$, as described below) for the survival model (e.g., a Cox regression model) may be used (e.g., by transaction service provider system 102 and/or the deep learning model system) during training of the deep learning model. For example, instead of a supervised classification loss function for fraud detection, the loss function for a survival model may be implemented directly in the deep learning model. Additionally or alternatively, the loss function (and therefore the adjustment of parameters during training) may be based on the following equation:

$$L = 1/M \Sigma_1^M w_i l_i,$$

where $w_i > 1$ for each payment account (e.g., PAN) with a long transaction history (e.g., as represented by the aforementioned field), M is batch size, and $l_i$ is the survival loss (e.g., log partial likelihood loss, proportional hazard model loss, and/or the like), L is the total loss in the batch (e.g., weighted by information from a long transaction history). In some non-limiting embodiments or aspects, generating the fraud risk score may include using (e.g., by transaction service provider system 102 and/or the deep learning model system) the deep learning model (e.g., with its loss function based on the survival model) to generate the fraud risk score for each subperiod based on the transaction data for the payment account(s) (e.g., the payment account(s) for which the attempted attack(s) were detected).

As shown in FIG. 3, at step 308, process 300 may include generating a survival curve. For example, transaction service provider system 102, the deep learning model system, and/or the survival model system may generate a survival curve based on the fraud risk score for each subperiod, e.g., for each payment account for which an attempted attack has been detected. In some non-limiting embodiments or aspects, each survival curve may include a plot of fraud risk scores with respect to subperiods for a given payment account (e.g., a respective payment account for which an attempted attack has been detected), as described herein. For the purpose of illustration, exemplary survival curves are further discussed below with respect to FIGS. 5-6B.

In some non-limiting embodiments or aspects, transaction service provider system 102, the deep learning model system, and/or the survival model system may determine an area bounded by the survival curve (e.g., an area above the survival curve, an area below the survival curve, and/or the like). Additionally or alternatively, transaction service provider system 102, the deep learning model system, and/or the survival model system may compare the area to a threshold (e.g., a selectable threshold, such as a preselected threshold, a dynamically selected threshold, and/or the like) to determine whether the payment account associated with the survival curve is in a high risk category (e.g., whether at least one fraudulent transaction is highly likely to occur in the next time period (e.g., 30 days from the day the payment account was attacked)). For example, if the area is greater than a selected threshold (e.g., 0.05 (corresponding to 5%) and/or the like) transaction service provider system 102, the deep learning model system, and/or the survival model system may take further action based on the area. For example, the further action may include sending a notification indicating that the payment account is in the high risk category (e.g., to issuer system 104, a fraud detection system (e.g., of transaction service provider system 102 and/or issuer system 104), and/or the like). Additionally or alternatively, transaction service provider system 102 may adjust monitoring of the payment account based on the payment account being in the high risk category. Additionally or alternatively, issuer system 104 may adjust monitoring of the payment account based on receiving the notification indicating that the payment account is in the high risk category. For the purpose of illustration, areas bounded by exemplary survival curves are further discussed below with respect to FIGS. 6A and 6B.

As shown in FIG. 3, at step 310, process 300 may include accepting and/or rejecting at least one subsequent transaction based on the risk score. For example, transaction service provider system 102 and/or issuer system 104 may accept or reject each subsequent transaction based on the respective fraud risk score (e.g., for the payment account associated with the subsequent transaction) for the subperiod during which the subsequent transaction occurs. Additionally or alternatively, transaction service provider system 102 and/or issuer system 104 may accept or reject each subsequent transaction based on the payment account associated with the subsequent transaction being in the high risk category, as described herein.

For example, when the time period after the attempted attack is a 30-day period and each subperiod is a day, transaction service provider system 102 and/or issuer system 104 may accept or reject a subsequent transaction based on the respective fraud risk score of the payment account (e.g., associated with the subsequent transaction) for the day during which the subsequent transaction occurs. For example, transaction service provider system 102 and/or issuer system 104 may determine whether to accept or reject the subsequent transaction based solely on the fraud risk score or may determine whether to accept or reject the subsequent transaction based on the fraud risk score and other criteria (e.g., criteria otherwise used by transaction service provider system 102 and/or issuer system 104 to determine whether to accept and/or reject a transaction, such as a predictive model, a deep learning model, a set of rules, features of transaction data and/or attributes determined based thereon, any combination thereof, and/or the like). In some non-limiting embodiments or aspects, transaction service provider system 102 and/or issuer system 104 may reject the subsequent transaction based on the respective fraud risk score of the payment account (e.g., associated with the subsequent transaction) for the day during which the subsequent transaction occurs. Additionally or alternatively, transaction service provider system 102 and/or issuer system 104 may accept the subsequent transaction based on the respective fraud risk score of the payment account (e.g., associated with the subsequent transaction) for the day during which the subsequent transaction occurs.

Figure 4A:
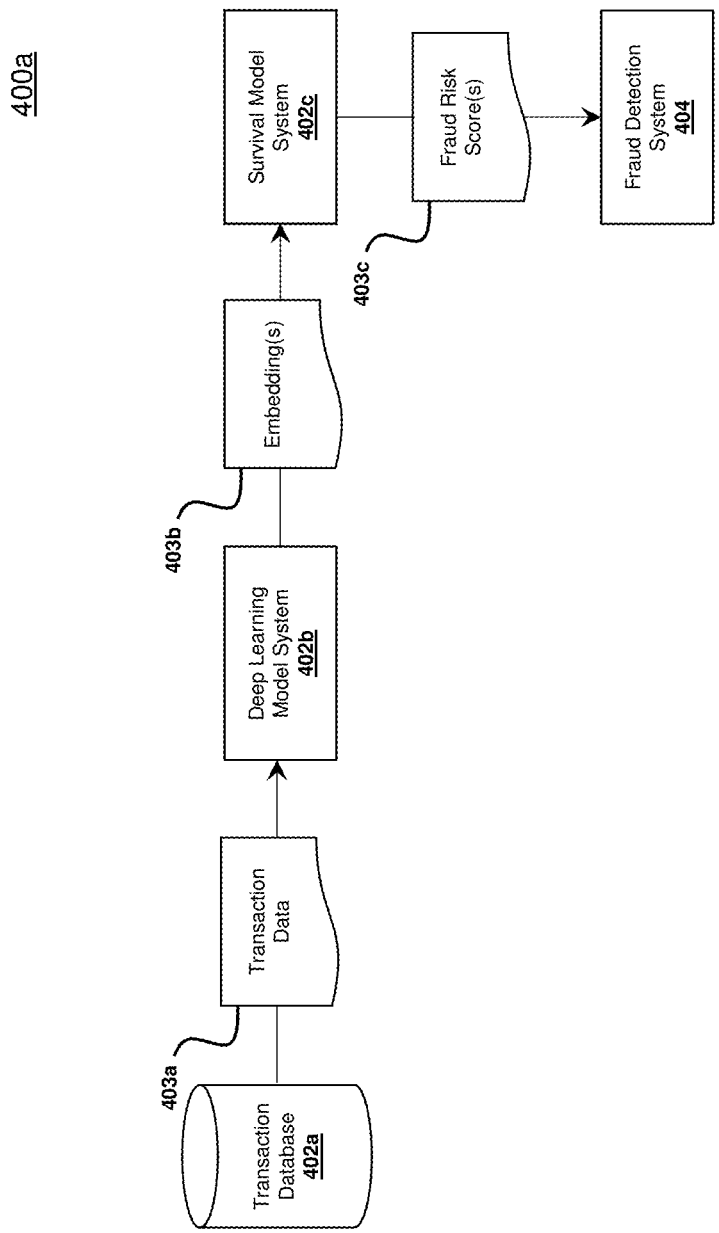
FIGS. 4A and 4B are diagrams of non-limiting embodiments or aspects of implementations of non-limiting embodiments or aspects of the process shown in FIG. 3 according to the principles of the presently disclosed subject matter.

Referring now to FIG. 4A, FIG. 4A is a diagram of an exemplary implementation 400a of a non-limiting embodiment or aspect relating to process 300 shown in FIG. 3. As shown in FIG. 4A, implementation 400a may include transaction database 402a, deep learning model system 402b, survival model system 402c, transaction data 403a, embedding(s) 403b, fraud risk score(s) 403c, and/or fraud detection system 404. In some non-limiting embodiments or aspects, transaction database 402a may be the same as, similar to, part of (e.g., a subsystem of and/or the like), and/or implemented (e.g., completely, partially, and/or the like) by transaction service provider system 102. Additionally or alternatively, transaction database 402a may be the same as, similar to, part of (e.g., a subsystem of and/or the like), and/or implemented (e.g., completely, partially, and/or the like) by another system, another device, another group of systems, or another group of devices, separate from or including transaction service provider system 102, such as issuer system 104. In some non-limiting embodiments or aspects, deep learning model system 402b may be the same as, similar to, part of (e.g., a subsystem of and/or the like), and/or implemented (e.g., completely, partially, and/or the like) by transaction service provider system 102. Additionally or alternatively, deep learning model system 402b may be the same as, similar to, part of (e.g., a subsystem of and/or the like), and/or implemented (e.g., completely, partially, and/or the like) by another system, another device, another group of systems, or another group of devices, separate from or including transaction service provider system 102, such as issuer system 104. In some non-limiting embodiments or aspects, survival model system 402c may be the same as, similar to, part of (e.g., a subsystem of and/or the like), and/or implemented (e.g., completely, partially, and/or the like) by transaction service provider system 102. Additionally or alternatively, survival model system 402c may be the same as, similar to, part of (e.g., a subsystem of and/or the like), and/or implemented (e.g., completely, partially, and/or the like) by another system, another device, another group of systems, or another group of devices, separate from or including transaction service provider system 102, such as issuer system 104. In some non-limiting embodiments or aspects, fraud detection system 404 may be the same as, similar to, part of (e.g., a subsystem of and/or the like), and/or implemented (e.g., completely, partially, and/or the like) by issuer system 104. Additionally or alternatively, fraud detection system 404 may be the same as, similar to, part of (e.g., a subsystem of and/or the like), and/or implemented (e.g., completely, partially, and/or the like) by another system, another device, another group of systems, or another group of devices, separate from or including issuer system 104, such as transaction service provider system 102.

In some non-limiting embodiments or aspects, transaction database 402a may receive transaction data 403a associated with a plurality of transactions of at least one payment account, as described herein. For example, a transaction service provider system (e.g., transaction service provider system 102) may store transaction data 403a in transaction database 402a.

In some non-limiting embodiments or aspects, deep learning model system 402b may receive (e.g., retrieve and/or the like) transaction data 403a from transaction database 402a, as described herein. For example, deep learning model system 402b may receive (e.g., retrieve and/or the like) transaction data 403a associated with (at least some of) the transactions of the payment account(s) from the transaction database (e.g., of transaction service provider system 102 and/or the like). For example, deep learning model system 402b may receive (e.g., retrieve and/or the like) transaction data 403a associated with all transactions associated with the payment account(s) during a preceding time period, as described herein.

In some non-limiting embodiments or aspects, deep learning model system 402b may detect at least one attempted attack based on transaction data 403a. Additionally or alternatively, deep learning model system 402b may receive transaction data 403a based on a transaction service provider system (e.g., transaction service provider system 102) and/or an issuer system (e.g., issuer system 104) detecting the attempted attack(s).

In some non-limiting embodiments or aspects, deep learning model system 402b may include (e.g., implement and/or the like) at least one deep learning model, e.g., at least one of a deep neural network, an RNN, an LSTM network, any combination thereof, and/or the like, as described herein. Additionally or alternatively, the deep learning model may be trained (e.g., by deep learning model system 402b) based on transaction data 403a for a plurality of transactions associated with a plurality of accounts (e.g., historical transaction data associated with a plurality of historical transactions stored in transaction database 402a), as described herein.

In some non-limiting embodiments or aspects, after an attempted attack is detected for a payment account, deep learning model system 402b may provide as input to the deep learning model transaction data 403a associated with the transactions associated with that payment account (e.g., all transactions associated with that payment account during the preceding time period, which may be stored in transaction database 402a) as described herein). Additionally or alternatively, deep learning model system 402b may use the deep learning model to generate at least one embedding 403b (e.g., as output based on transaction data 403a that was provided as input), as described herein. In some non-limiting embodiments or aspects, the embedding(s) 403b may be communicated from deep learning model system 402b to survival model system 402c.

In some non-limiting embodiments or aspects, survival model system 402c may implement at least one survival model, e.g., a Cox regression model (e.g., Cox proportional hazards (PH) regression model and/or the like), as described herein. In some non-limiting embodiments or aspects, survival model system 402c may use the survival model to generate the fraud risk score 403c for each subperiod of a plurality of subperiods in a time period following the attempted attack(s) based on the embedding(s) 403b for the payment account(s), as described herein.

In some non-limiting embodiments or aspects, survival model system 402c may generate a survival curve, as described herein. Additionally or alternatively, survival model system 402c may determine the area bounded by the survival curve and/or compare the area to a threshold to determine whether the payment account associated with the survival curve is in a high risk category, as described herein.

In some non-limiting embodiments or aspects, survival model system 402c may communicate fraud risk score(s) 403c (e.g., a sequence of fraud risk scores 403c for all subperiods in the time period) for the payment account(s) (e.g., for each payment account for which an attempted attack was detected) to fraud detection system 404, as described herein. Additionally or alternatively, survival model system 402c may communicate the area bounded by the survival curve(s) for the payment account(s) (e.g., for each payment account for which an attempted attack was detected) and/or an indication that the payment account(s) (e.g., at least one of the payment accounts for which an attempted attack was detected) is in the high risk category to fraud detection system 404, as described herein.

In some non-limiting embodiments or aspects, fraud detection system 404 may determine whether to accept and/or reject at least one subsequent transaction based on fraud risk score(s) 403c, as described herein. For example, fraud detection system 404 may determine whether to accept or reject each subsequent transaction based on the respective fraud risk score (e.g., for the payment account associated with the subsequent transaction) for the subperiod during which the subsequent transaction occurs. Additionally or alternatively, fraud detection system 404 may accept or reject each subsequent transaction based on the payment account associated with the subsequent transaction being in the high risk category, as described herein.

Figure 4B:
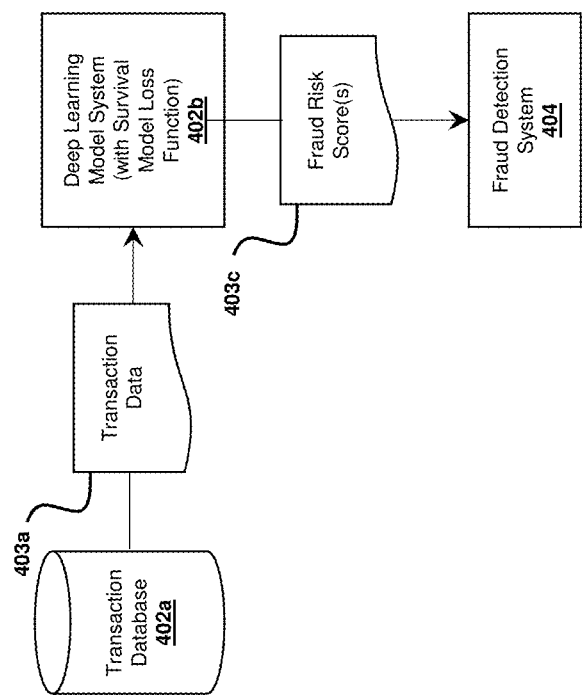

Referring now to FIG. 4B, FIG. 4B is a diagram of an exemplary implementation 400b of a non-limiting embodiment or aspect relating to process 300 shown in FIG. 3. As shown in FIG. 4B, implementation 400b may include transaction database 402a, deep learning model system 402b, transaction data 403a, fraud risk score(s) 403c, and/or fraud detection system 404. In some non-limiting embodiments or aspects, transaction database 402a may be the same as, similar to, part of (e.g., a subsystem of and/or the like), and/or implemented (e.g., completely, partially, and/or the like) by transaction service provider system 102. Additionally or alternatively, transaction database 402a may be the same as, similar to, part of (e.g., a subsystem of and/or the like), and/or implemented (e.g., completely, partially, and/or the like) by another system, another device, another group of systems, or another group of devices, separate from or including transaction service provider system 102, such as issuer system 104. In some non-limiting embodiments or aspects, deep learning model system 402b may be the same as, similar to, part of (e.g., a subsystem of and/or the like), and/or implemented (e.g., completely, partially, and/or the like) by transaction service provider system 102. Additionally or alternatively, deep learning model system 402b may be the same as, similar to, part of (e.g., a subsystem of and/or the like), and/or implemented (e.g., completely, partially, and/or the like) by another system, another device, another group of systems, or another group of devices, separate from or including transaction service provider system 102, such as issuer system 104. In some non-limiting embodiments or aspects, fraud detection system 404 may be the same as, similar to, part of (e.g., a subsystem of and/or the like), and/or implemented (e.g., completely, partially, and/or the like) by issuer system 104. Additionally or alternatively, fraud detection system 404 may be the same as, similar to, part of (e.g., a subsystem of and/or the like), and/or implemented (e.g., completely, partially, and/or the like) by another system, another device, another group of systems, or another group of devices, separate from or including issuer system 104, such as transaction service provider system 102.

In some non-limiting embodiments or aspects, transaction database 402a may receive transaction data 403a associated with a plurality of transactions of at least one payment account, as described herein. For example, a transaction service provider system (e.g., transaction service provider system 102) may store transaction data 403a in transaction database 402a.

In some non-limiting embodiments or aspects, deep learning model system 402b may receive (e.g., retrieve and/or the like) transaction data 403a from transaction database 402a, as described herein. For example, deep learning model system 402b may receive (e.g., retrieve and/or the like) transaction data 403a associated with (at least some of) the transactions of the payment account(s) from the transaction database (e.g., of transaction service provider system 102 and/or the like). For example, deep learning model system 402b may receive (e.g., retrieve and/or the like) transaction data 403a associated with all transactions associated with the payment account(s) during a preceding time period, as described herein.

In some non-limiting embodiments or aspects, deep learning model system 402b may detect at least one attempted attack based on transaction data 403a. Additionally or alternatively, deep learning model system 402b may receive transaction data 403a based on a transaction service provider system (e.g., transaction service provider system 102) and/or an issuer system (e.g., issuer system 104) detecting the attempted attack(s).

In some non-limiting embodiments or aspects, deep learning model system 402b may include (e.g., implement and/or the like) at least one deep learning model, e.g., at least one of a deep neural network, an RNN, an LSTM network, any combination thereof, and/or the like, as described herein. Additionally or alternatively, the deep learning model may be trained (e.g., by deep learning model system 402b) based on transaction data 403a for a plurality of transactions associated with a plurality of accounts (e.g., historical transaction data associated with a plurality of historical transactions stored in transaction database 402a), as described herein. In some non-limiting embodiments or aspects, a loss function for the deep learning model may be based on the survival model. For example, the survival model loss may be used (e.g., by deep learning model system 402b) during training of the deep learning model, as described herein.

In some non-limiting embodiments or aspects, after an attempted attack is detected for a payment account, deep learning model system 402b may provide as input to the deep learning model transaction data 403a associated with the transactions associated with that payment account (e.g., all transactions associated with that payment account during the preceding time period, which may be stored in transaction database 402a), as described herein. Additionally or alternatively, deep learning model system 402b may use the deep learning model to generate the fraud risk score 403c for each subperiod of a plurality of subperiods in a time period following the attempted attack(s) (e.g., as output based on transaction data 403a that was provided as input), as described herein.

In some non-limiting embodiments or aspects, deep learning model system 402b may generate a survival curve, as described herein. Additionally or alternatively, deep learning model system 402b may determine the area bounded by the survival curve and/or compare the area to a threshold to determine whether the payment account associated with the survival curve is in a high risk category, as described herein.

In some non-limiting embodiments or aspects, deep learning model system 402b may communicate fraud risk score(s) 403c (e.g., a sequence of fraud risk scores 403c for all subperiods in the time period) for the payment account(s) (e.g., for each payment account for which an attempted attack was detected) to fraud detection system 404, as described herein. Additionally or alternatively, deep learning model system 402b may communicate the area bounded by the survival curve(s) for the payment account(s) (e.g., for each payment account for which an attempted attack was detected) and/or an indication that the payment account(s) (e.g., at least one of the payment accounts for which an attempted attack was detected) is in the high risk category to fraud detection system 404, as described herein.

In some non-limiting embodiments or aspects, fraud detection system 404 may determine whether to accept and/or reject at least one subsequent transaction based on fraud risk score(s) 403c, as described herein. For example, fraud detection system 404 may determine whether to accept or reject each subsequent transaction based on the respective fraud risk score (e.g., for the payment account associated with the subsequent transaction) for the subperiod during which the subsequent transaction occurs. Additionally or alternatively, fraud detection system 404 may accept or reject each subsequent transaction based on the payment account associated with the subsequent transaction being in the high risk category, as described herein.

Figure 5:
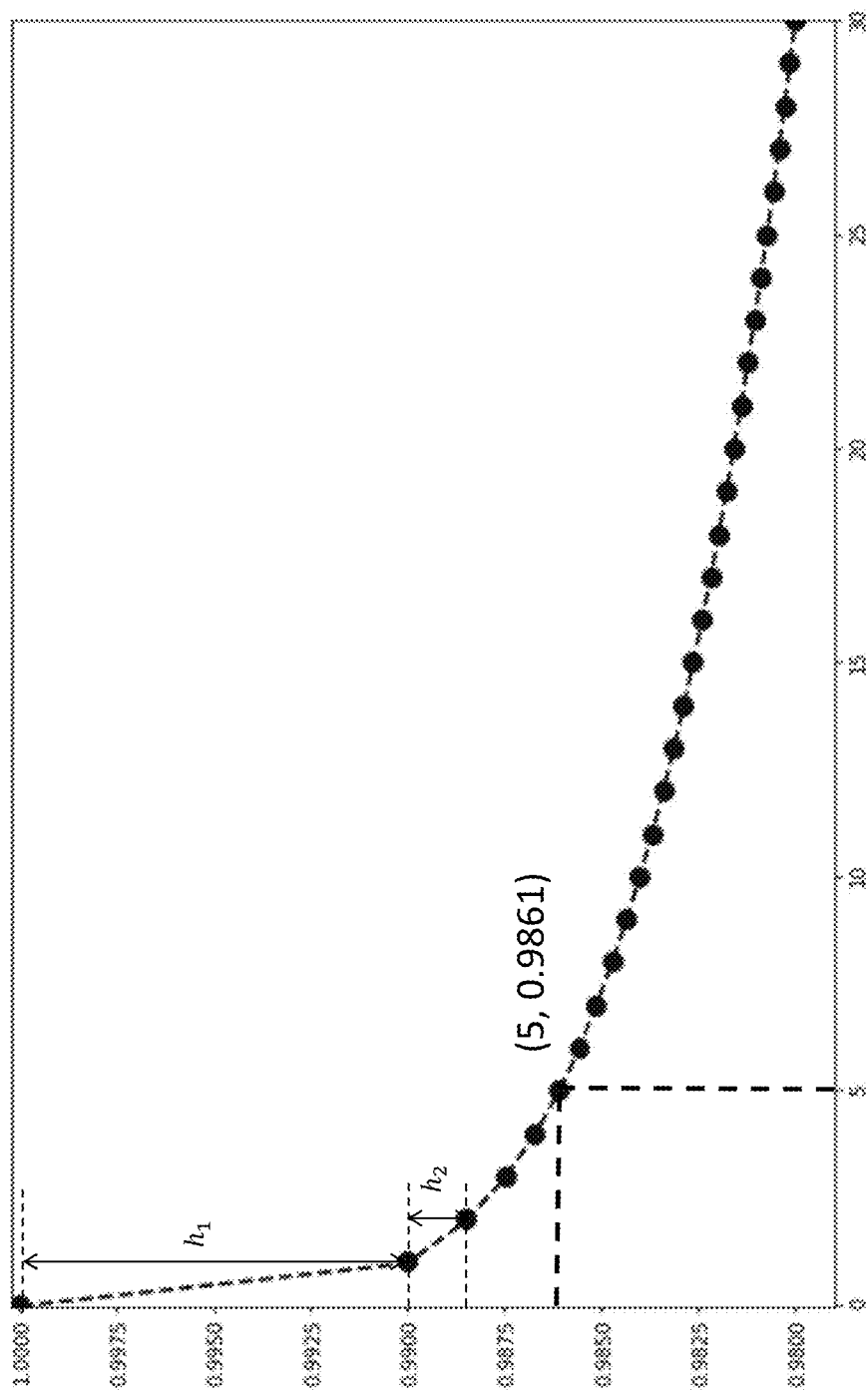
FIG. 5 is a plot of fraud risk scores with respect to subperiods according to a non-limiting embodiment or aspect of an implementation of a non-limiting embodiment or aspect of the process shown in FIG. 3 according to the principles of the presently disclosed subject matter.

Referring now to FIG. 5, FIG. 5 is a plot of an exemplary survival curve from an exemplary implementation of a non-limiting embodiment or aspect relating to process 300 shown in FIG. 3. As shown in FIG. 5, subperiods (e.g., days) may be shown on the horizontal axis, and probabilities that fraud has not occurred may be shown on the vertical axis. For example, as shown in FIG. 5, at subperiod 5 (e.g., five days after the attempted attack is detected), the probability that no fraud will occur is 0.9861 (e.g., corresponding to 98.61%).

In some non-limiting embodiments or aspects, a difference (h) between probabilities that fraud has not occurred on successive subperiods (e.g., days) may be determined. For example, the difference between subperiod 0 (e.g., the day of the attempted attack) and subperiod 1 (e.g., one day after the attempted attack) may be denoted as $h_1$, the difference between subperiod 1 and subperiod 2 (e.g., two days after the attempted attack) may be denoted as $h_2$, etc. Additionally or alternatively, the sequence of such differences (e.g., $h_1$, $h_2$, . . . , $h_{30}$) may be used (e.g., by transaction service provider system 102, issuer system 104, and/or the like) to evaluate the risk level for each subperiod (e.g., subperiod 1, subperiod 2, . . . , subperiod 30) after the subperiod (e.g., day) of the attempted attack.

In some non-limiting embodiments or aspects, fraud risk scores (e.g., probabilities that no fraud has occurred by a respective subperiod) may be used for other models (e.g., fraud detection models of transaction service provider system 102, issuer system 104, and/or the like) to make decline/accept determinations for subsequent transactions occurring during the respective subperiod (e.g., occurring that day).

Figures 6A, 6B:
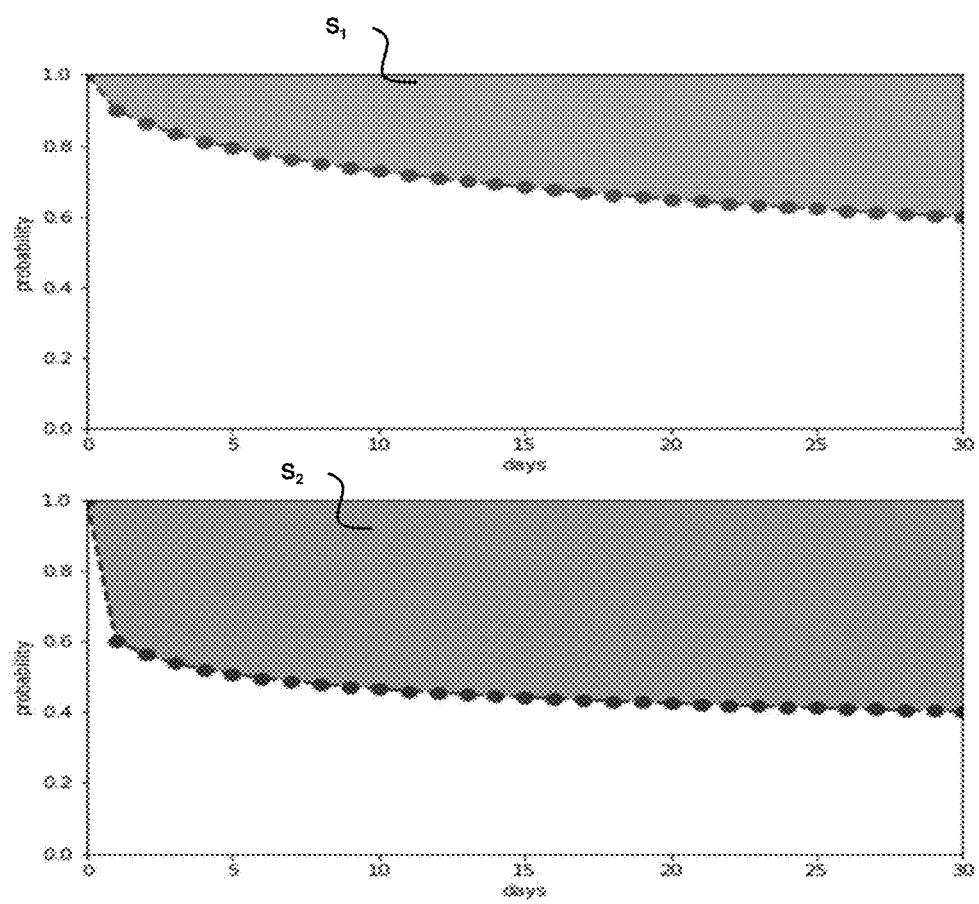
FIGS. 6A and 6B are plots of fraud risk scores with respect to subperiods according to non-limiting embodiments or aspects of implementations of non-limiting embodiments or aspects of the process shown in FIG. 3 according to the principles of the presently disclosed subject matter.

Referring now to FIGS. 6A and 6B, FIGS. 6A and 6B are plots of exemplary survival curves from exemplary implementations of non-limiting embodiments or aspects relating to process 300 shown in FIG. 3. As shown in FIGS. 6A and 6B, subperiods (e.g., days) may be shown on the horizontal axis, and probabilities that fraud has not occurred may be shown on the vertical axis. Additionally or alternatively, the area bounded by (e.g., above) the survival curve in each of FIGS. 6A and 6B may be indicated by shading. For example, the area bounded by the survival curve in FIG. 6A may be denoted as $S_1$, and the area bounded by the survival curve in FIG. 6B may be denoted as $S_2$.

In some non-limiting embodiments or aspects, the area bounded by (e.g., above) each survival curve (e.g., $S_1$, $S_2$, and/or the like) may be used as a risk indicator (e.g., of total risk for the time period, which may be a 30-day period and/or the like, as described herein). For example, if $S_1 < S_2$, that may indicate a first account associated with the survival curve shown in FIG. 6A is less risky (e.g., less likely to have fraud(s) occur during the time period) than a second account associated with the survival curve shown in FIG. 6B.

In some non-limiting embodiments or aspects, the area (S) above a survival curve may be calculated (e.g., by transaction service provider system 102 and/or the like) based on the following equation:

$$S = \frac{1}{30} \sum_{i=1}^{30} \left(1 - \frac{p_i + p_{i-1}}{2}\right)$$

assuming the time period includes 30 subperiods (e.g., a 30-day time period including 30 1-day subperiods), where pi is the probability associated with the ith subperiod.

In some non-limiting embodiments or aspects, a selected (e.g., preselected, typical, historical average, and/or the like) rate of fraudulent transactions may be denoted as r and may be used as a threshold. Additionally or alternatively, if the area (S) bounded by (e.g., above) a survival curve is greater than that threshold (e.g., $S > r$), a payment account associated with that survival curve may be determined (e.g., by transaction service provider system 102, issuer system 104, and/or the like) to be in a high risk category. For example, if r=0.05 (e.g., corresponding to 5%), a payment account associated with a survival curve for which $S > 0.05$ may be determined (e.g., by transaction service provider system 102, issuer system 104, and/or the like) to be in a high risk category.

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment or aspect can be combined with one or more features of any other embodiment or aspect.

What is claimed is:

1. A computer-implemented method, comprising:

training, by a transaction service provider system, a deep learning model based on historical transaction data associated with a plurality of historical transactions to provide a respective embedding for each payment account associated with the historical transaction data, wherein training comprises inputting the historical transaction data for each payment account associated with the historical transaction data to the deep learning model to provide a respective hidden layer vector, wherein each respective embedding comprises the respective hidden layer vector, wherein the deep learning model comprises a plurality of parameters, and wherein training the deep learning model comprises updating at least one parameter of the plurality of parameters based on the respective embedding for each payment account and a loss function;

receiving, by the transaction service provider system, transaction data associated with a plurality of transactions of at least one payment account;

detecting, by the transaction service provider system, at least one attempted attack based on the transaction data;

generating, by the transaction service provider system, using the deep learning model and a survival model, a fraud risk score for each subperiod of a plurality of subperiods in a time period following the at least one attempted attack based on the transaction data, wherein generating the fraud risk score comprises:

generating at least one embedding for each payment account of the at least one payment account based on inputting the transaction data for each payment account of the at least one payment account to the deep learning model to provide at least one hidden layer vector, wherein each embedding of the at least one embedding comprises a hidden layer vector of the at least one hidden layer vector; and generating the fraud risk score for each subperiod based on inputting the at least one embedding to the survival model, wherein the fraud risk score for each respective subperiod is associated with a probability that a fraudulent transaction will not occur by the respective subperiod;

generating, by the transaction service provider system, a survival curve based on the fraud risk score for each subperiod;

determining, by the transaction service provider system, an area bounded by the survival curve;

comparing, by the transaction service provider system, the area to a threshold to determine whether the at least one payment account is in a high risk category;

sending, by the transaction service provider system, a notification to an issuer system based on determining the at least one payment account is in the high risk category, the notification indicating that the at least one payment account is in the high risk category;

adjusting, by the issuer system, monitoring of the at least one payment account based on receiving the notification indicating that the at least one payment account is in the high risk category, wherein adjusting monitoring is based on the probability that the fraudulent transaction will not occur by the respective subperiod;

initiating, by a point-of-sale (POS) device of a merchant system, a subsequent transaction by generating an authorization request message associated with the subsequent transaction;

sending, by the merchant system, the authorization request message associated with the subsequent transaction to an acquirer system;

based on receiving the authorization request message associated with the subsequent transaction, sending, by the acquirer system, the authorization request message to the issuer system, wherein the issuer system determines an authorization decision based on the authorization request; and rejecting, by the issuer system, the subsequent transaction associated with the authorization request based on determining the at least one payment account is in the high risk category and adjusting monitoring of the at least one payment account.

2. The method of claim 1, wherein the transaction data includes all transactions associated with each payment account of the at least one payment account during a preceding time period.

3. The method of claim 1, wherein the deep learning model comprises at least one of a deep neural network, a recurrent neural network (RNN), a long short term memory (LSTM) network, or any combination thereof.

4. The method of claim 1, wherein the survival model comprises a Cox regression model.

5. The method of claim 1, wherein each subperiod comprises a day.

6. The method of claim 1, wherein the time period comprises a month.

7. The method of claim 1, wherein rejecting the subsequent transaction comprises rejecting the subsequent transaction based on determining the at least one payment account is in the high risk category and the fraud risk score of at least one subperiod of the plurality of subperiods.

8. A system, comprising:

a transaction service provider system comprising at least one first processor, the at least one first processor configured to:

train a deep learning model based on historical transaction data associated with a plurality of historical transactions to provide a respective embedding for each payment account associated with the historical transaction data, wherein training comprises inputting the historical transaction data for each payment account associated with the historical transaction data to the deep learning model to provide a respective hidden layer vector, wherein each respective embedding comprises the respective hidden layer vector, wherein the deep learning model comprises a plurality of parameters, and wherein training the deep learning model comprises updating at least one parameter of the plurality of parameters based on the respective embedding for each payment account and a loss function;

receive transaction data associated with a plurality of transactions of at least one payment account;

detect at least one attempted attack based on the transaction data;

generate, using the deep learning model and a survival model, a fraud risk score for each subperiod of a plurality of subperiods in a time period following the at least one attempted attack based on the transaction data, wherein, when generating the fraud risk score, the at least one processor of the transaction service provider system is configured to:

generate at least one embedding for each payment account of the at least one payment account based on inputting the transaction data for each payment account of the at least one payment account to the deep learning model to provide at least one hidden layer vector, wherein each embedding of the at least one embedding comprises a hidden layer vector of the at least one hidden layer vector; and generate the fraud risk score for each subperiod based on inputting the at least one embedding to the survival model, wherein the fraud risk score for each respective subperiod is associated with a probability that a fraudulent transaction will not occur by the respective subperiod;

generate a survival curve based on the fraud risk score for each subperiod;

determine an area bounded by the survival curve;

compare the area to a threshold to determine whether the at least one payment account is in a high risk category; and send a notification to an issuer system based on determining the at least one payment account is in the high risk category, the notification indicating that the at least one payment account is in the high risk category; and the issuer system comprising at least one second processor different from the at least one first processor, the at least one second processor configured to:

adjust monitoring of the at least one payment account based on receiving the notification indicating that the at least one payment account is in the high risk category, wherein adjusting monitoring is based on the probability that the fraudulent transaction will not occur by the respective subperiod;

a merchant system comprising at least one third processor different from the at least one first processor and the at least one second processor, the at least one third processor configured to:

initiate a subsequent transaction by generating an authorization request message associated with the subsequent transaction; and send the authorization request message associated with the subsequent transaction;

an acquirer system comprising at least one fourth processor different from the at least one first processor, the at least one second processor, and the at least one third processor, the at least one fourth processor configured to:

based on receiving the authorization request message associated with the subsequent transaction, send the authorization request message to the issuer system, wherein the at least one second processor of the issuer system is further configured to:

determine an authorization decision based on the authorization request; and reject the subsequent transaction associated with the authorization request based on determining the at least one payment account is in the high risk category and adjust monitoring of the at least one payment account.

9. The system of claim 8, wherein the transaction data includes all transactions associated with each payment account of the at least one payment account during a preceding time period.

10. The system of claim 8, wherein the deep learning model comprises at least one of a deep neural network, a recurrent neural network (RNN), a long short term memory (LSTM) network, or any combination thereof.

11. The system of claim 8, wherein the survival model comprises a Cox regression model.

12. The system of claim 8, wherein each subperiod comprises a day.

13. The system of claim 8, wherein the time period comprises a month.

14. The system of claim 8, wherein, when rejecting the at least one subsequent transaction, the at least one second processor is configured to:
reject the subsequent transaction based on determining the at least one payment account is in the high risk category and the fraud risk score of at least one subperiod of the plurality of subperiods.

15. A computer program product comprising at least one non-transitory computer-readable medium including one or more instructions that, when executed by at least one processor, cause the at least one processor to:
train, at a transaction service provider system, a deep learning model based on historical transaction data associated with a plurality of historical transactions to provide a respective embedding for each payment account associated with the historical transaction data, wherein training comprises inputting the historical transaction data for each payment account associated with the historical transaction data to the deep learning model to provide a respective hidden layer vector, wherein each respective embedding comprises the respective hidden layer vector, wherein the deep learning model comprises a plurality of parameters, and wherein training the deep learning model comprises updating at least one parameter of the plurality of parameters based on the respective embedding for each payment account and a loss function;
receive, at the transaction service provider system, transaction data associated with a plurality of transactions of at least one payment account;
detect, at the transaction service provider system, at least one attempted attack based on the transaction data;
generate, at the transaction service provider system using the deep learning model and a survival model, a fraud risk score for each subperiod of a plurality of subperiods in a time period following the at least one attempted attack based on the transaction data, wherein, when generating the fraud risk score, the one or more instructions cause the at least one processor to:
generate at least one embedding for each payment account of the at least one payment account based on inputting the transaction data for each payment account of the at least one payment account to the deep learning model to provide at least one hidden layer vector, wherein each embedding of the at least one embedding comprises a hidden layer vector of the at least one hidden layer vector; and
generate the fraud risk score for each subperiod based on inputting the at least one embedding to the survival model, wherein the fraud risk score for each respective subperiod is associated with a probability that a fraudulent transaction will not occur by the respective subperiod;
generate, at the transaction service provider system, a survival curve based on the fraud risk score for each subperiod;
determine, at the transaction service provider system, an area bounded by the survival curve;
compare, at the transaction service provider system, the area to a threshold to determine whether the at least one payment account is in a high risk category;
send, at the transaction service provider system, a notification to an issuer system based on determining the at least one payment account is in the high risk category, the notification indicating that the at least one payment account is in the high risk category;
adjust, at the issuer system, monitoring of the at least one payment account based on receiving the notification indicating that the at least one payment account is in the high risk category, wherein adjusting monitoring is based on the probability that the fraudulent transaction will not occur by the respective subperiod;
initiate, at a point-of-sale (POS) device of a merchant system, a subsequent transaction by generating an authorization request message associated with the subsequent transaction;
send, by the merchant system, the authorization request message associated with the subsequent transaction to an acquirer system;
based on receiving the authorization request message associated with the subsequent transaction, send, by the acquirer system, the authorization request message to the issuer system, wherein the issuer system determines an authorization decision based on the authorization request; and
reject, at the issuer system, at least one subsequent transaction based on determining the at least one payment account is in the high risk category and adjusting monitoring of the at least one payment account.

16. The computer program product of claim 15, wherein the transaction data includes all transactions associated with each payment account of the at least one payment account during a preceding time period.

17. The computer program product of claim 15, wherein the deep learning model comprises at least one of a deep neural network, a recurrent neural network (RNN), a long short term memory (LSTM) network, or any combination thereof.

18. The computer program product of claim 15, wherein the survival model comprises a Cox regression model.

19. The computer program product of claim 15, wherein each subperiod comprises a day and the time period comprises a month.

20. The computer program product of claim 15,
wherein, when rejecting the subsequent transaction, the instructions cause the at least one processor to:
reject the subsequent transaction based on determining the at least one payment account is in the high risk category and the fraud risk score of at least one subperiod of the plurality of subperiods.

* * * * *